MECHANICALLY SIMULATING ELECTRONIC SIGNAL CHOPPER

Filed Aug. 18, 1966

INVENTOR.
FRANK J. WOOLAM
BY Harry R. Lubcke
AGENT

United States Patent Office 3,421,072

Patented Jan. 7, 1969

3,421,072

MECHANICALLY SIMULATING ELECTRONIC SIGNAL CHOPPER

Frank J. Woolam, Tarzana, Calif., assignor to Valid Data Corporation, Calabasas, Calif., a corporation of California Filed Aug. 18, 1966, Ser. No. 573,376

U.S. Cl. 321—45 10 Claims

Int. Cl. H02m 7/44; 7/68

ABSTRACT OF THE DISCLOSURE

An electrical chopper suited as a replacement for a mechanical chopper. A relaxation oscillator having oppositely phased outputs is driven from oscillatory means through an impedance and at least one biased diode. Preferably an FET transistor is connected to each of the oppositely phased outputs of the relaxation oscillator to alternately gate the output circuit of the chopper. A shielded transformer is preferably interposed between the oscillatory means and the relaxation oscillator. The chopper may be self-powered by a rectifier also connected to the transformer. Appropriate output connections provide either a break-before-make or a make-before-break sequence.

Figures 1, 2:
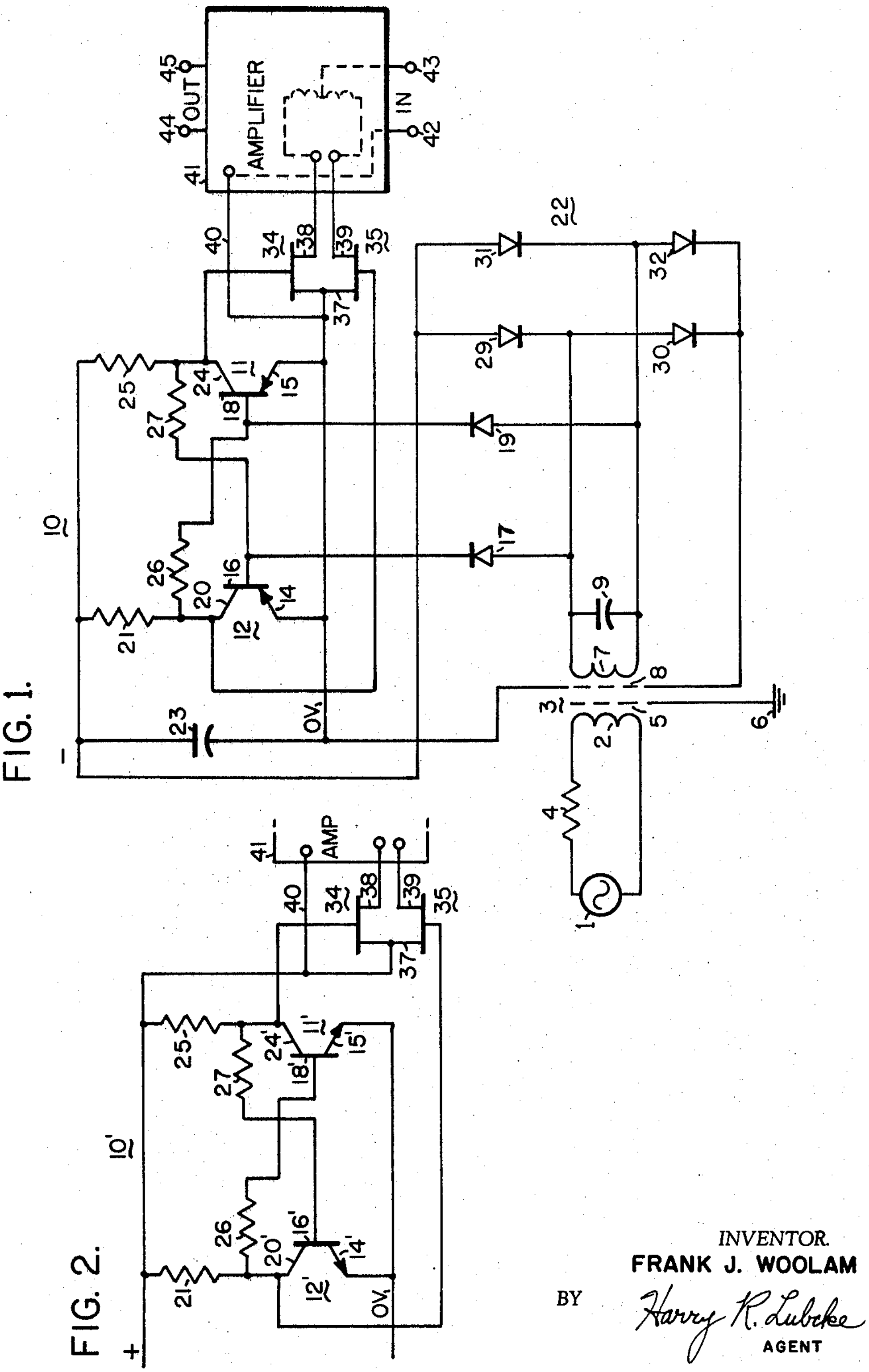

This invention relates to an all-electrical device for interrupting an electrical signal for the purpose of amplification or the like.

When it is required to amplify relatively feeble electrical energy in the frequency range starting at a varying direct current ("D.C.") through typically the audio frequency spectrum, the known "chopper amplifier" is very often used. In such an apparatus the incoming signal is first "chopped" to a higher frequency than it inherently has, is amplified by the known alternating current ("A.C.") amplifier, and then is rectified and filtered to provide an amplified replica of the incoming signal. The "chopping" is often performed by a magnetically actuated mechanical reed having contacts.

The mechanical vibrating devices have certain shortcomings, such as contact "bounce." This is a rapid variation of contact resistance upon either or both make and break contacting, which correspondingly varies the signal being handled. To avoid the consequences of contact bounce the chopped waveform must be utilized only in the central portion of the time duration of each half cycle thereof. This makes post-amplification filtering difficult. Also, the dwell time between each half cycle varies with the age of a mechanical chopper. Operating life is frequently limited because of the pitting of contacts or the impairment of the operating performance because of the effects of outgassing vibrator drive coils acting chemically upon the contacts.

On the other hand, mechanical choppers have certain advantages over ordinary circuits for all-electrical chopping. They do not have the inherent offset of the usual bi-polar transistor devices, which range at best from one-half to one millivolt. Matched transistors for smaller offsets do not remain constant as to this parameter.

Heretofore, the different characteristics between mechanical choppers and all-electrical chopper circuits have prevented that prior art from employing the latter as a replacement for the former.

According to this invention, the several prior shortcomings of all-electrical choppers as replacements for mechanical choppers have been overcome and the best qualities of both types of choppers have been obtained.

For example, the life expectancy of the all-electrical chopper of this invention is one hundred times that of a mechanical chopper. A relaxation oscillator, such as a transistorized flip-flop, is employed to provide the basic chopping waveform. The actual chopping of the output circuit is accomplished by two further transistors, particularly of the field effect transistor ("FET") type. This type does not have semiconductor junction paths in series with the signal path. Thus, there is no voltage offset. In addition, a transformer having a low magnitude of primary to secondary capacitance is employed to introduce the drive signal into the relaxation oscillator. This provides a high degree of isolation between drive and signal circuits, a feature often lacking in the prior art.

Because mechanical inertia is not involved, the all-electrical chopper of this invention is effective over a broad range of operating frequencies. A relatively precise "break-before-make" chopping action is secured. By an alternate embodiment a similarly precise "make-before-break" action may also be secured.

Mechanical choppers have a phase lag with respect to the driving signal for the same because of mechanical inertia. In order that the chopper of this invention be interchangeable with prior mechanical choppers, the relaxation oscillator is triggered to change its state near the peak of the drive signal. Thus, a phase lag approaching 90° can be obtained from this aspect. Impedance elements are connectable in association with the drive transformer, so that the phase lag can be varied as desired to simulate the phase lag of a particular mechanical device. In this way, an exact replacement for a mechanical chopper previously employed with a particular chopper apparatus amplifier is provided; thereby supplying improved operating characteristics and long chopper life without replacing the whole relatively costly apparatus. In either new or existing apparatus, the improved characteristics of the all-electrical chopper of this invention, as constant dwell, symmetry of waveform and uniform transit time, and the constancy of these characteristics provides improved performance over-all.

Objects of this invention are to provide; (1) an all-electrical means for interrupting an electrical signal, (2) such means having greatly improved electrical characteristics because of novel elements, (3) such means to form a replacement for electro-mechanical choppers, and (4) such means having relatively long life, small size and inexpensive cost to manufacture. Other objects will be apparent upon examining the following specification and drawings, in which are set forth by way of example certain embodiments of the invention.

FIG. 1 shows the complete schematic diagram of the all-electrical chopper according to this invention in which the contacting sequence is "break-before-make," and FIG. 2 shows a fragmentary modification of the same for the "make-before-break" sequence.

As a part of the whole amplifier apparatus, oscillator 1 of FIG. 1 provides the drive, or initiating chopper electrical energy. This oscillator typically provides a sine wave shape of electrical energy at a frequency of 400 Hz. (cycles per second). It has been found, however, according to this invention that frequencies in the range of from 300 Hz. to 1,000,000 Hz. may be utilized. The range of from 300 Hz. to 800 Hz. is preferred for existing amplifier apparatus, with 400 Hz. usually used.

Oscillator 1 is connected to primary 2 of shielded transformer 3, typically through a dissipative impedance connected in the circuit in series such as resistor 4. The larger the value of this resistor the smaller will be the lag between the sine waveshape and the actuation of the chopper circuit. From the approximately 90° lag previously mentioned a value of lag frequently desired is 60° and this is thusly obtained. Practical values for resistor 4 lie in the range of from 0 to 150 ohms.

An electrostatic shield 5 is disposed in shielding proximity to primary 2 and is typically electrically connected to an outer conductive case for the whole chopper device. This has been represented in FIG. 1 as ground connection 6. Secondary 7 of transformer 3 is normally wound with 1.2 times the number of turns of primary 2. This provides a desired energizing voltage, say 11 volts, to the gating transistors, as will be evident later. The secondary is somewhat removed from the primary in the construction of transformer 3, so that the capacitance between these two windings will be as small as possible. An electrostatic shield 8 is provided for shielding secondary 7. This shield is connected to a zero voltage circuit "OV," which connects several elements internal to the chopper device, as will be later described.

An impedance of typically capacitative reactance 9 may be connected in shunt across secondary 7 for purposes of phase control. This impedance gives an advance in phase angle. A typical capacitance value for element 9 is 0.2 microfarad and a typical range of such values is from 0 to 1.2 microfarads. The larger the capacitance value the greater is the advance of phase angle. With impedance elements 4 and 9, it is seen that the phase angle between driving voltage and chopper response may be adjusted as desired.

The basic switching action of the chopper is controlled by the flip-flop generally indicated in FIG. 1 at 10. This is comprised of transistors 11 and 12, which may be of the PNP 2N3905 type, and four resistors. The emitters 14 and 15 of the transistors connect directly to internal zero voltage circuit OV, which latter also connects to transformer shield 8. Base 16 of transistor 12 connects to the upper terminal of secondary 7 through diode 17, which may be of the Tex. Instr. type 6. Similarly and symmetrically, base 18 of transistor 11 connects to the lower terminal of secondary 7 through diode 19. The anode of each diode connects to the secondary of the transformer. Collector 20 of transistor 12 connects to resistor 21 and therethrough to source of negative operating voltage 22 (below in FIG. 1). The second terminal of this source connects to internal zero voltage circuit OV. Source 22 may have an output voltage of 11 volts and may be the known bridge-connected power supply employing four rectifiers as is shown. Capacitor 23, typically of 6.8 microfarads capacitance, is connected across source 22 for usual filtering and reduction of source impedance reasons.

Collector 24 of transistor 11 connects to resistor 25 and therethrough to source 22. Resistors 21 and 25 may each have a resistance of 68,000 ohms. The transistors are cross-connected to produce relaxation oscillation by resistor 26 connecting from base 18 to collector 20 and by resistor 27 connecting from base 16 to collector 24. Each resistor may have a resistance of 360,000 ohms.

Rectifier 29, 30, 31, 32 are connected to secondary 7 of transformer 3 to form source 22. The cathode of rectifier 29 and the anode of rectifier 30 are connected to the upper terminal of secondary 7 and the anode of rectifier 29 connects to resistors 21 and 25 as the negative output of the rectifier, while the cathode of rectifier 30 connects to internal voltage zero circuit OV. All of these rectifiers may be semiconductor diodes, such as the Tex. Inst. type 6 or 7.

Similarly, the cathode of rectifier 31 and the anode of rectifier 32 are connected to the lower terminal of secondary 7 and the anode of rectifier 31 also connects to resistors 21 and 25, while the cathode of rectifier 32 connects to zero voltage circuit OV. These elements comprise a bridge rectifier which rectifies the oscillatory energy from oscillator 1 and this makes the all-electrical chopper of this invention self-powering.

The switching proper is accomplished by field effect transistors 34 and 35. These may be of the 2N3819 type, having a channel of "N" type semiconductor material. The gate of FET 34 is connected to collector 24 of transistor 11 and the gate of FET 35 is connected to collector 20 of transistor 12. The sources of the FET's are connected together and to the zero voltage circuit OV; the two connected sources being identified by numeral 37. Drain 38 of FET 34 constitutes one of the output terminals of the chopper, corresponding to one of the stationary contacts of a mechanical chopper. Drain 39 of FET 35 similarly forms the other output terminal. An additional connection 40 to the common sources 37 forms the third output connection, corresponding to the vibrating reed element of a mechanical chopper.

An amplifier 41 is connected to the output circuit of the chopper of this invention for interrupting incoming signals to be amplified, as are impressed across input terminals 42, 43, as is known. Amplifier 41 may be a Sanborn Type 860–4300. An illustrative circuit for connecting the chopper output circuit to the input terminals of amplifier 41 is shown dotted within the rectangle representing the know amplifier apparatus. The amplified output is obtained at output terminals 44, 45, after the chopped input signal has been A.C. amplified and then rectified, as has been previously mentioned.

In operation, the phase lag between the sine wave drive energy from oscillator 1 and the triggering of flip-flop 10 is accomplished by triggering the latter at nearly the peak of the sine wave on the upward-going side. This is accomplished by an approximately 0.6 volt positive potential at the anode of diode 17, the cathode thereof then being at approximately zero volts because of the drop inherent in a silicon semiconductor device. The base 16 of transistor 12 is thus brought to zero volts and the transistor is cut off. The voltage across resistor 21 decreases and collector 20 increases in negative potential. This potential is transferred to base 18 of transistor 11 through resistor 26, thus flip-flop 10 flips. The approximate 0.6 volt positive potential at the anode of diode 17 occurs because this is the forward voltage drop of rectifier 30. On the other peak of the drive signal flip-flop transistor 11 is cut off by a similar functioning by diode 19.

This flip-flop operation is impressed upon field effect transistors 34 and 35. When collector 24 of transistor 11 is "low," FET 34 is in the "on" condition. When collector 20 of transistor 12 is "low," FET 35 is in the "on" condition. In the operation of the flip-flop there is a brief interval of time, measured in microseconds, when both sides of the same are "off," the output potentials from the collectors being high. With the common sources 37 of the FET's connected to the zero voltage circuit OV both FET's are also "off." This gives the desired "break-before-make" action, which is of value in the functioning of amplifier 41.

There are, however, other types of amplifiers 41 and equivalent use circuits for which a "make-before-break" action is desired. The circuit changes required to accomplish this are shown in FIG. 2. That part of FIG. 1 not shown is not altered, nor are elements in FIG. 2 which bear the same reference numerals as in FIG. 1. Such elements as are modified have been given primed reference numerals.

Transistors 11′ and 12′ are of the NPN type. Resistors 21 and 25 connect to a positive voltage source the equivalent of source 22, but having merely an opposite polarity of voltage output. The significant modification is the connection of the common sources 37 of FET's 34 and 35 to the positive voltage supply by conductor 47, rather than to the OV circuit of FIG. 1. This inverts the potential status between each gate of the FET's and the common source 37, thus the FET's are both "on" during the commutation period for the flip-flop and the "make-before-break" action is obtained.

Although this invention has been described in preferred forms with a certain degree of particularity, this been only by way of example. Various changes in the circuit arrangement, the characteristics of the circuit elements, and the substitution of equivalents may be made without departing from the spirit and scope of the invention.

Having thus fully described the invention and the manner in which it is to be practiced, I claim:

1. An electrical chopper having an output circuit, comprising:

(a) a relaxation oscillator having oppositely phased outputs, (b) oscillatory means including an impedance and a diode having a bias connected in series between said oscillatory means and said relaxation oscillator, to drive said relaxation oscillator, and (c) a transistor connected to each of the oppositely phased outputs of said relaxation oscillator, to alternately conductively gate the output circuit of said electrical chopper.

2. The electrical chopper of claim 1 which additionally includes:

(a) a transformer having a primary and a secondary, (b) a connection from said oscillatory means to said primary through said impedance, and (c) a connection from said secondary to said diode.

3. The electrical chopper of claim 2 which additionally includes:

(a) an outer conductive case, (b) an electrostatic shield surrounding said primary connected to said case, and (c) an electrostatic shield surrounding said secondary connected to said output circuit.

4. The electrical chopper of claim 2 in which:

(a) said impedance is a resistor to alter the phase angle between the output of said oscillatory means and the alternate gating of said output circuit.

5. The electrical chopper of claim 2 which additionally includes:

(a) a capacitive impedance, (b) connections from each side of said secondary to said capacitive impedance, and (c) further connections from each side of said capacitive impedance through a diode to said relaxation oscillator.

6. The electrical chopper of claim 2 which additionally includes:

(a) a bridge rectifier connected to the secondary of said transformer, and (b) a connection from said bridge rectifier to said relaxation oscillator, for the energization of said relaxation oscillator.

7. The electrical chopper of claim 1 in which each said transistor is a field effect transistor having a gate, a source and a drain, and which additionally includes:

(a) a connection from each said oppositely phased output to a gate of a said field effect transistor, (b) a connection connecting the sources of said field effect transistors together and to said output circuit, and (c) a separate connection from each drain of said field effect transistors to said output circuit.

8. The electrical chopper of claim 7 which additionally includes:

(a) a zero voltage circuit connected to said relaxation oscillator, and (b) a connection from said zero voltage circuit to the sources of both said field effect transistors, whereby the output circuit is switched with a break-before-make sequence.

9. The electrical chopper of claim 7 which additionally includes:

(a) a positive polarity voltage supply circuit connected to said relaxation oscillator, and (b) a connection from said positive polarity voltage supply circuit to the sources of both said field effect transistors, whereby the output circuit is switched with a make-before-break sequence.

10. The electrical chopper of claim 1 in which said relaxation oscillator is a flip-flop having two cross-connected transistors, and which additionally includes:

(a) a connection from each collector of said cross-connected transistors to a gate electrode of each of the said transistors connected to said oppositely phased outputs.

References Cited

UNITED STATES PATENTS

| | | | |
|---|---|---|---|
| 2,959,725 | 11/1960 | Younkin | 321—45 XR |
| 3,039,042 | 6/1962 | Chatterton | 323—44 |
| 3,128,438 | 4/1964 | Suda | 321—45 XR |
| 3,177,422 | 4/1965 | Schlereth | 321—45 |
| 3,246,176 | 4/1966 | Nazareth | 307—88.5 |
| 3,260,921 | 7/1966 | Brahm | 321—45 |
| 3,305,757 | 2/1967 | Schlabach et al. | 321—45 XR |
| 3,317,758 | 5/1967 | Nazareth et al. | 307—88.5 |
| 3,317,856 | 5/1967 | Wilkinson | 321—45 XR |
| 3,341,766 | 9/1967 | Rhyne | 321—45 XR |

JOHN F. COUCH, *Primary Examiner.*

W. SHOOP, *Assistant Examiner.*

U.S. Cl. X.R.

307—240, 251, 304